United States Patent
Gierlak et al.

(10) Patent No.: US 9,535,677 B2
(45) Date of Patent: Jan. 3, 2017

(54) SOFTWARE DISCOVERY IN AN ENVIRONMENT WITH HETEROGENEOUS MACHINE GROUPS

(71) Applicant: International Business Machines Corporation, Armonk, NY (US)

(72) Inventors: Marcin Gierlak, Krakow (PL); Bartlomiej T. Malecki, Krakow (PL); Slawomir T. Mezyk, Krakow (PL); Michal Paluch, Krakow (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/801,964

(22) Filed: Jul. 17, 2015

(65) Prior Publication Data

US 2016/0026449 A1     Jan. 28, 2016

(30) Foreign Application Priority Data

Jul. 28, 2014   (GB) .................................. 1413287.2

(51) Int. Cl.
G06F 9/445     (2006.01)
G06F 9/44      (2006.01)

(52) U.S. Cl.
CPC . *G06F 8/61* (2013.01); *G06F 8/60* (2013.01); *G06F 8/70* (2013.01)

(58) Field of Classification Search
None
See application file for complete search history.

(56) References Cited

U.S. PATENT DOCUMENTS

| | | | |
|---|---|---|---|
| 6,883,169 B1* | 4/2005 | Guilbeault | G06F 8/61 709/203 |
| 7,254,631 B2* | 8/2007 | Crudele | G06F 8/61 709/224 |
| 7,506,038 B1* | 3/2009 | Perrone | G06F 8/60 709/220 |
| 8,086,627 B2 | 12/2011 | Pastorelli | |

(Continued)

FOREIGN PATENT DOCUMENTS

WO    WO9425913 A2    11/1994
WO    WO2008/119610 A1    10/2008

OTHER PUBLICATIONS

Dearle, "Software Deployment, Past, Present and Future," 2007, FOSE '07, 2007 Future of Software Engineering, pp. 269-284.*

(Continued)

*Primary Examiner* — Thuy Dao
*Assistant Examiner* — Stephen Berman
(74) *Attorney, Agent, or Firm* — Francis Lammes; Stephen J. Walder, Jr.; Richard A. Wilhelm (57) ABSTRACT

A mechanism is provided for software discovery in an environment with heterogeneous machine groups may be provided. A group comprising computing systems that have similar software program installations is defined. A first scan procedure is performed by scanning each computing system of the group using a first software signature catalogue to identify installed programs. Software signatures of identified installed programs are added to a base installation software catalogue. A second scan procedure is performed by scanning the group of computing systems using the base installation software catalogue to identify installed software programs.

17 Claims, 3 Drawing Sheets

(56) References Cited

U.S. PATENT DOCUMENTS

| | | | |
|---|---|---|---|
| 8,307,355 B2 | 11/2012 | Capomassi et al. | |
| 8,438,543 B2* | 5/2013 | Carbone | G06F 8/60 717/120 |
| 8,495,621 B2* | 7/2013 | Traut | G06F 8/36 463/42 |
| 8,539,445 B2* | 9/2013 | Gangemi | G06F 8/60 717/120 |
| 8,549,514 B2* | 10/2013 | Carteri | G06F 8/61 717/103 |
| 2003/0192029 A1* | 10/2003 | Hughes | G06F 8/20 717/101 |
| 2005/0278395 A1 | 12/2005 | Sandaire | |
| 2006/0021061 A1 | 1/2006 | Cerri et al. | |
| 2006/0184932 A1* | 8/2006 | Burnley | G06F 8/60 717/174 |
| 2006/0271491 A1* | 11/2006 | Lois Ballard | G06F 8/61 705/57 |
| 2007/0220507 A1* | 9/2007 | Back | G06F 8/71 717/170 |
| 2008/0189419 A1* | 8/2008 | Girle | G06F 8/65 709/227 |
| 2008/0229303 A1* | 9/2008 | Carteri | G06F 8/61 717/177 |
| 2009/0248636 A1* | 10/2009 | Gangemi | G06F 8/60 |
| 2009/0280907 A1* | 11/2009 | Larsen | G06F 8/60 463/42 |
| 2011/0138461 A1* | 6/2011 | Bhargava | G06F 21/554 726/21 |
| 2011/0246980 A1* | 10/2011 | Fagen | G06F 8/61 717/174 |
| 2011/0289495 A1* | 11/2011 | Mulligan | G06F 8/61 717/168 |
| 2011/0295937 A1* | 12/2011 | Howard | G06F 8/61 709/203 |
| 2012/0054733 A1* | 3/2012 | Vidal | G06F 8/65 717/171 |
| 2013/0055202 A1* | 2/2013 | Dudek | G06F 8/61 717/120 |
| 2013/0080511 A1* | 3/2013 | Majka | G06F 17/30109 709/203 |
| 2014/0108774 A1* | 4/2014 | Bennah | G06F 8/60 713/2 |
| 2014/0282413 A1* | 9/2014 | Grimme | G06F 8/60 717/124 |
| 2015/0172146 A1* | 6/2015 | Mahaffey | G06F 8/70 709/224 |
| 2015/0363186 A1* | 12/2015 | Judge | G06F 8/65 717/170 |

OTHER PUBLICATIONS

Hall et al., "A cooperative approach to support software deployment using the software dock," 1999, Proceedings of the 21st international conference on Software engineering, pp. 174-183.*

Dastkerdi et al., "An Effective Architecture for Automated Appliance Management System Applying Ontology-Based Cloud Discovery," 2010, CCGRID '10 Proceedings of the 2010 10th IEEE/ACM International Conference on Cluster, Cloud and Grid Computing, pp. 104-112.*

Rozenblit, "Secure Software Distribution," 1994, Symposium Record, 1994 IEEE, Network Operations and Management Symposium, pp. 486-496.*

Zaremsky et al., "Signature matching: a tool for using software libraries," 1995, Journal ACM Transactions on Software Engineering and Methodology (TOSEM) TOSEM Homepage archive, vol. 4, Issue 2, pp. 146-170.*

Heiner et al., "Secure software installation in a mobile environment," 2007, Proceeding SOUPS '07, Proceedings of the 3rd symposium on Usable privacy and security, pp. 155-156.*

"Creating a software signature", IBM Corporation, http://www-01.ibm.com/support/knowledgecenter/SS2GNX_5.1.1/com.ibm.tivoli.tpm.ept.doc/scenariosoa/septsoa_lesson9.html, Tivoli Provisioning Manager, Version 5.1.1.0, retrieved from the Internet Jun. 4, 2015, 1 page.

"Hierarchical software signatures catalog in level based software scans", Disclosed Anonymously, www.ip.com, IP.com Prior Art Database Technical Disclosure, IP.com No. IPCOM000222767D, Oct. 22, 2012, 5 pages.

* cited by examiner

SOFTWARE DISCOVERY IN AN ENVIRONMENT WITH HETEROGENEOUS MACHINE GROUPS

BACKGROUND

The invention relates generally to a method for software discovery in an environment with heterogeneous machine groups. The invention relates further to a system for software discovery in an environment with heterogeneous machine groups, a computing system, a data processing program, and a computer program product.

Software asset management systems provide detailed information about all installed software on computing systems, based on registry/file system scans. Software inventory scans are typically based on information from a software catalogue, which is a collection of discovery signatures for all possible software programs. Such software discovery catalogues can be very extensive due to the number of different software products on the market, not only current but also historical, as well as many different signature types which may be used to discover the same or different product releases.

Every time a software inventory scan is scheduled, all that data in the file system has to be processed and all signatures have to be evaluated. This may consume many resources of the scanned computing systems and may take large amounts of time. The workload generated by the scan procedures may not be available for productive processing.

Another negative effect of such full software scans is that the amount of data returned to a software asset management server may be quite large; in order to aggregate that data many software asset management server resources are additionally required. Moreover, additional network traffic is generated.

There are several disclosures related to a method for software discovery. For example, document U.S. Pat. No. 8,539,445 B2 discloses a method and a corresponding system for discovering software products on a plurality of computers. The discovery method can populate a software catalogue without the manual intervention of an administrator.

Document U.S. Pat. No. 8,438,543 B2 discloses a solution for discovering shared components of software products installed on a data processing system. In order to achieve this result, for each software product the corresponding software components are aggregated into groups; each group includes software components that must be linked by a corresponding relationship, such as a co-location in the same operating system image. This way, it is possible to assign a software component—e.g., a library—available on the system to its software product even when it may be used by more of them.

However, there continues to be a need to address the problem of large overhead when discovering software based on a software catalogue having software signatures.

SUMMARY

This need may be addressed by a method for software discovery in an environment with heterogeneous machine groups, a system for software discovery in an environment with heterogeneous machine groups, a computing system, a data processing program, and a computer program product, according to the independent claims.

According to one embodiment, a method for software discovery in an environment with heterogeneous machine groups may be provided. The method may comprise defining a group comprising computing systems that have similar software program installations and performing a first scan procedure by scanning each computing system of the group using a first software signature catalogue to identify installed programs.

The method may also comprise adding software signatures of identified installed programs to a base installation software catalogue and performing a second scan procedure by scanning the defined group of computing systems using the base installation software catalogue to identify installed software programs, wherein the second scan procedure may be performed—in particular, at a later time than performing the first scan procedure.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a software discover system is provided. The software discover system may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

Preferred embodiments of the invention will now be described, by way of example only, and with reference to the following drawings.

DETAILED DESCRIPTION

It may also be noted that the similar software installations may be identical software program installations. Software signatures, attributes or other identifiers of the installed software programs which have been identified during the first scan may be stored as part of the base installation software catalogue.

In the context of this description, the following conventions, terms and/or expressions may be used:

The term "similar software program installations" may denote that on a group of computing systems a number of a total number of software program installations is identical on the computing systems of the group. A degree of similarity may be defined by a threshold number. If the threshold number may be "1"—meaning 100%—the software program installations may be identical on all involved computing systems or machines. It may not be required that the total number of installed software programs is identical on the related computing systems. Only the number of installed identical software programs may be relevant. Individual computing systems may have additional software program installed on them. These may be identical to all computing systems of the group.

The term "first scan procedure" may denote a software discovery procedure performed, e.g., by a software discovery agent running on the related computing system for identifying installed software programs. For different types of installed software program different types of agents may be used optionally. The agent may use specific attributes of the discovered software for identifying the installed software programs. The first scan procedure may use a first software catalogue comprising a large number of software signatures in order to discover as many different installed software programs as possible.

The term "file signature" may denote data used to identify or verify the content of a file. In particular, it may refer to, e.g., a file magic number, i.e., bytes within a file used to identify the format of the file; sometimes a short sequence of bytes (often 2 to 4 bytes long) placed at the beginning of the file; or, a file checksum, or more generally, a result of a hash function over the file content. The file signature may also be included in the middle of the file, or at the end of the file, or in a separate file. Other mechanisms for identifying files, in particular those files being executable software, may be used. Besides others, attributes used as a software signature may comprise a software file path, a software file header, a software product name, a software product version, a software product vendor, a software product patch level and/or another specific key or identifier.

The term "base installation software catalogue" may denote a software catalogue comprising identification features or software signatures of installed software programs that have been identified during the first scan procedure. Initially, and at the beginning of the first scan procedure, the base installation software catalogue may be empty. It may be filled the more installed software program may be found by the first scan procedure. For installed software program found, an entry may be inserted or added into the base installation software catalogue.

The proposed method for software discovery in an environment with heterogeneous machine groups may offer a couple of advantages:

The second scan with the in size reduced base installation software catalogue allows a much faster scan procedure to (re-) discover installed software programs in the computing systems or machines of the defined group. The discovered software programs only need a reduced effort when comparing found attributes of the installed software with software signatures of the base installation software catalogue if compared to a full scan procedure, i.e., first scan procedure using the first software catalogue.

Additionally, the grouping of the computing systems or machines reduces the base installation software catalogue even more. Most software programs installed on the computing systems of the defined group have identical software programs installed because this is the basis for forming the group.

Thus, a reduced workload for software discovery processes in a software asset management is the result.

In one embodiment, the method may also comprise generating a list of computing systems forming a sub-group of the group of computing systems having similar software program installations, wherein on the computing systems list the relative number of identical installed software programs may be higher than the relative number of installed software programs of the group of computing systems.

This feature may be advantageous in two ways:

(a) If all relevant computing systems or machines may be in only one group in the beginning of the overall software discovery procedure, sub-groups of the initial total computing systems group may be defined. Such sub-groups may define a more homogeneous group of computing systems having software program installations installed on them that have a higher degree of similarity if compared to the original larger group of computing systems. Different groups of installed software program groups may be selected or defined using a set of rules for specific types of installed software programs. The rules may identify system programs, middleware program, batch program, program with user interaction, office programs, or software programs from one or more specific vendors, or equivalent.

(b) New groupings of computing systems may be recommended automatically in order to have a higher degree of similarity of software installations on the related computing systems of the recommended group. A more homogeneous software installation may be advantageous during the second scan procedure because the base software signature catalogue may be substantially smaller in size such that less comparison has to be performed in order to evaluate discovered software programs.

Additionally, an operator may receive recommendations for defining the group comprising computing systems that have similar software program installations. A processing may also be performed automatically that manages the group definition.

According to one embodiment of the method, the relative number of identical installed programs within the sub-group may be above a threshold. Such a threshold may be defined individually. It may be, e.g., 90%, meaning that more than 90% of installed software programs may by identical on all computing systems of the defined group. Other percentages may also be defined, e.g., 80%, 70%, 95%, or the like.

According to one further embodiment of the method, the members of the sub-group of computing systems may be based on a directive external to the computing systems. Such a directive may be received from a user input, it may be proposed by a service operator or it may be received from a systems management system, or a software asset management system.

According to one enhanced embodiment of the method, a software signature may be removed from the base installation software catalogue if the related software program may not be discovered during the second scan procedure on any of the computing systems of the group. This way, a base installation software catalogue may be cleaned if none of the related computing systems may show the related software program as installed software program. Hence, it may be ensured that the base installation software catalogue may be as small as possible, allowing for future fast second scan procedures.

According to a further enhanced embodiment of the method, a software signature of the related software program may be added to the base installation software catalogue if the software program is discovered as an installed software program during the second scan procedure on one of the computing systems of the group. This feature may ensure that no additional software program may be forgotten. It may ensure consistency across all computing systems of a group.

Additionally, if such additional discovered software program may result in bringing the similarity percentage of the identical program below the predefined threshold, a warning may be generated. Thus, it may be determined whether the related computing system may better belong to another group.

According to one advantageous embodiment method, the first scan procedure may be performed on one selected computing system using the first software signature catalogue to identify installed programs, while on all other members of the computing group the second scan procedure may be performed by scanning the related computing systems of the group of computing systems using the base installation software catalogue to identify installed computer programs. Thus, against the rule to scan all computing systems using the second scan procedure for the second and following scans on at least one selected computing system, the first software signature catalogue may be used. This may have the advantage that also new software programs that may have been installed after the first scan procedure may be discovered. Thus, the base installation software catalogue may be updated adequately.

According to one additional embodiment of the method, the selected computing system on which the first scan procedure may be performed may be defined by an external setting. This may be a manual assignment by a user. Other external settings may, e.g., be based on an external control system.

According to one embodiment method, the selected computing system on which the first scan procedure may be performed may be selected based on a predefined timing schema. Each time another computing system of a defined group may be selected for a full scan procedure while the remaining computing systems of the same group may perform the second scan procedure. The selection method may be called progressive selection. More details can be found below.

According to a further advanced embodiment of the method, the selected computing system on which the first scan procedure may be performed may be selected based on a workload of the relevant computing system. This decision may be based on a comparison of the workloads of the computing systems of a group. The one with the lowest workload may be selected to perform the first—or full— scan procedure while the other computing systems of the group perform the second scan method.

This way, the computing system having the lowest actual workload may perform the intensive first scan procedure with the first software catalogue while all other computing systems may perform the more "light weight" second scan procedure using the comparably small base software installation catalogue. Thus, this selection method may be called capacity selection. The computing system or agent running the full scan procedure may be selected by a rule, e.g., randomly, by location of the computing system, according to a user using the computing system, by age of the computing system, or any other appropriate rule.

Of course, other selection criteria may be used to select the one or more computing systems of the group to perform the first software scan procedure.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, a block diagram of an embodiment of the inventive method for software discovery in an environment with heterogeneous machine groups is given. Afterwards, further embodiments and a system for software discovery in an environment with heterogeneous machine groups will be described.

Figure 1:
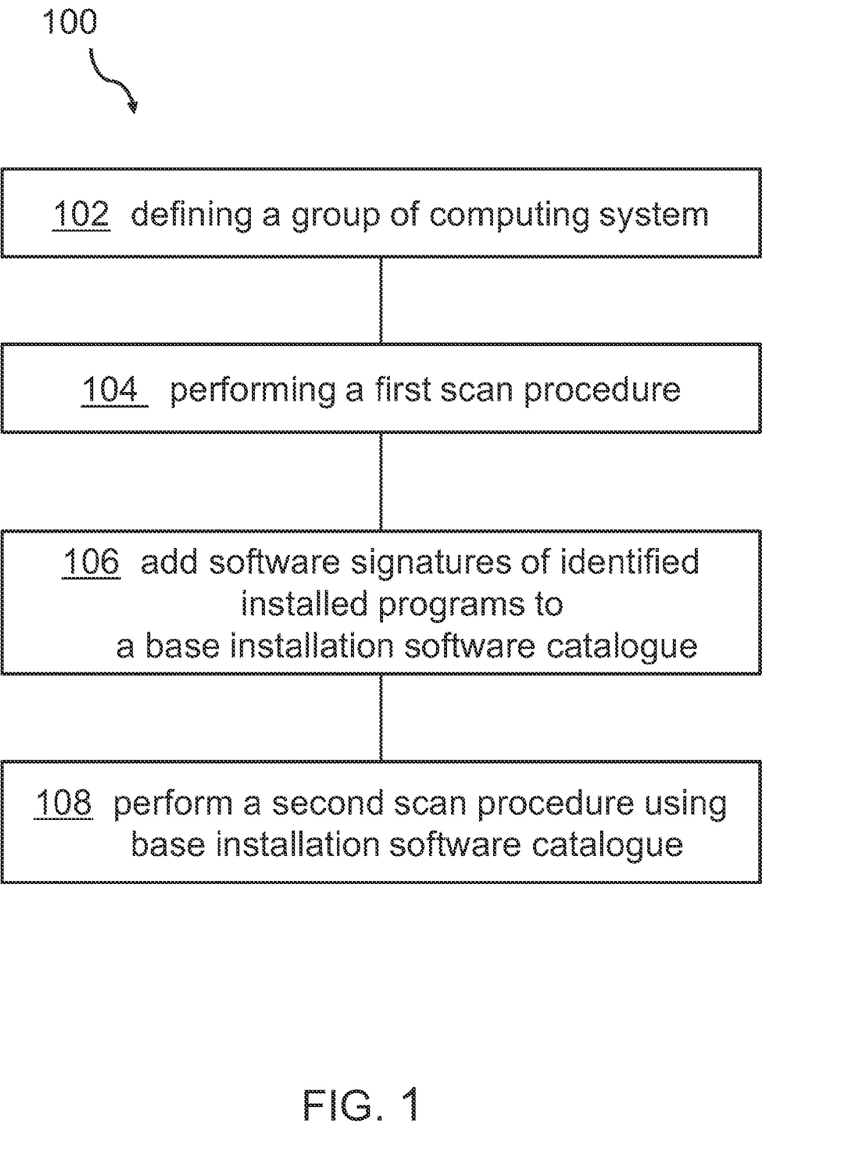
FIG. 1 shows a block diagram of an embodiment of the inventive method for software discovery in an environment with heterogeneous machine groups.

FIG. 1 shows a block diagram of an embodiment of the method 100 for identifying installed computer programs. The method may comprise defining, 102, a group comprising computing systems that have similar or identical software program installations and performing, 104, a first scan procedure by scanning each computing system of the group using a first software signature catalogue to identify installed programs. The method may also comprise adding, 106, software signatures of identified installed programs to a base installation software catalogue and also storing them there, and performing, 108, a second scan procedure, by scanning the group of computing systems using the base installation software catalogue to identify installed software programs, wherein the second scan procedure may be performed—in particular, at a later time than performing the first scan procedure. Thus, the second scan procedure may be performed using a smaller base installation software catalogue than the first software catalogue enabling a faster software discovery process on the computing systems of the defined group. Different base installation software catalogues may be used for different groups of a larger machine or computing system's park.

Figure 2:
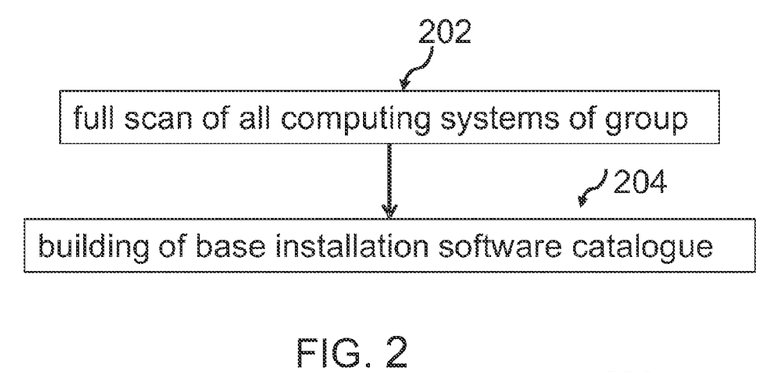
FIG. 2 shows a block diagram of the first scan procedure.

FIG. 2 shows a block diagram of the first scan procedure. During this phase of the complete method, a full scan of all computing systems of a group—which has been defined before—is performed, 202, using the first software signature catalogue. Such a catalogue may be quite extensive. Each time a match is found between an entry in the first software signature catalogue and discovered software on one of the computing systems, an entry is made in the base installation software catalogue, 204. Software that is discovered a second time on another computing system of the same group may not generate a second entry in the base installation software catalogue. Thus, for each software program, discovered during the full scan in the complete group of computing systems, there is one entry in the base installation software catalogue.

Figure 3:
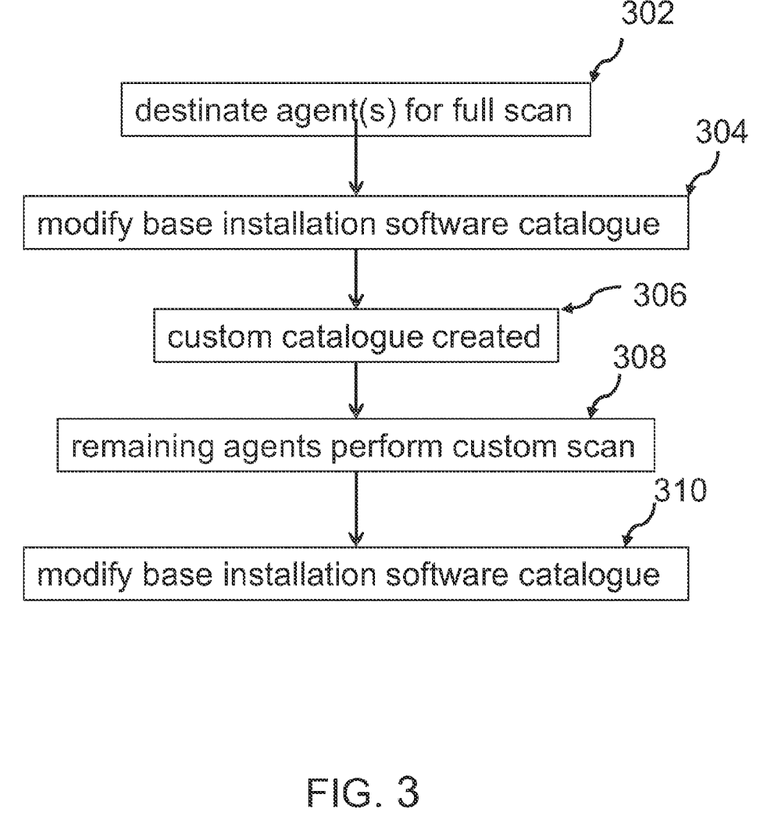
FIG. 3 shows a block diagram of an embodiment of second scan procedure with optional procedure steps.

FIG. 3 shows a block diagram of an embodiment of the second scan procedure with optional procedure steps. While the procedure according to FIG. 2 may be selected to be performed only once, the procedure according to FIG. 3 may be performed regularly and repetitively. It may be a scheduled repetition, or a random repetition, or a repetition as needed. Here, a special option is shown in which not only second scan procedures are performed on the computing systems of the group, but also a full scan procedure using the first software catalogue on selected ones of the computing systems of the group. Thus, after a scan agent has been assigned, 302, on one computer of the group of computing systems a full scan procedure is performed, while on all other computing systems of the group a second scan procedure is performed using the base installation software catalogue.

If during the optional step of performing the full scan procedure additional installed software is discovered, the base software installation catalogue may be extended, 304, by an identifier of the additional software program being found. A new custom software catalogue—which may be equivalent to the base software installation catalogue—may be created, 306.

Scan agents on the remaining computing systems of the group may perform, 308, their second software scan procedure using the potentially modified base software installation program.

If an entry about installed software in the base software installation catalogue is not be found on any of the computing systems in the group, the entry may be deleted from the base software installation catalogue. This may again reduce the amount of data—and thus, entries—in the base software installation catalogue. If, however, an additional software program is found, the base installation software catalogue may be extended. Both, the deletion and the addition of entries in the base installation software catalogue are shown as 310 in FIG. 3.

The full scan procedure may be scheduled to run on different ones of the computing group each time a second scan procedure is scheduled. An example for a weekly schedule is shown in table 1. Of course, other timing schemas are equally possible.

TABLE 1

|  |  | agent 1 | agent 2 | agent 3 | Agent 4 | found sw |
|---|---|---|---|---|---|---|
| init. | inst. sw | A, B, C | A, C | B, C | D | A, B, C, D |
|  | scan meth | full scan | full scan | full scan | full sc. |  |
|  | found sw | A, B, C | A, C | B, C | D |  |
| week 1 | inst. sw | A, B, C | A, C | B, C | D | A, B, C, D |
|  | scan meth | full scan | custom | custom | custom |  |
|  | found sw | A, B, C | A, C | B, C | A, B, D |  |
| week 2 | inst. sw | A, B, C, D | A, B, C, D | B, C | D | A, B, C, D |
|  | scan meth | custom | full scan | custom | custom |  |
|  | found sw | A, B, C, D | A, B, C, D | B, C | A, B, D |  |
| week 3 | inst. sw | A, B, C, D | A, B, C, D | B, C | A, B, D | A, B, C, D |
|  | scan meth | custom | custom | full scan | custom |  |
|  | found sw | A, B, C, D | A, B, C, D | B, C | A, B, D |  |
| week 4 | inst. sw | A, C, D | A, B, D | B, C | A, B, D | A, B, C, D |
|  | scan meth | custom | custom | custom | full sc. |  |
|  | found sw | A, C, D | A, B, D | B, C | A, B, D |  |
| week 5 | inst. sw | A, C | A, B | B, C | A, B | A, B, C, D |
|  | scan meth | full scan | custom | custom | custom |  |
|  | found sw | A, C | A, B | B, C | A, B |  |
| week 6 | inst. sw | A, B, C, D, E | A, B, C, D, E | B, C | A, B | A, B, C |
|  | scan meth | custom | full scan | custom | custom |  |
|  | found sw | A, B, C, D, E | A, B, C, D, E | B, C | A, B |  |
| week 7 | inst. sw | A, B, C, D, E, F | A, B, C, D, E | A, B, C, D, E | A, B | A, B, C, D, E |
|  | scan meth | custom | custom | full scan | full sc. |  |
|  | found sw | A, B, C, D, E, F | A, B, C, D, E | A, B, C, D, E | A, B |  |
| week 8 | inst. sw | A, B, C, D, E, F | A, B, C, D, E | A, B, C, D, E | A, B | A, B, C, D, E, F |
|  | scan meth | full scan | full scan | custom | custom |  |
|  | found sw | A, B, C, D, E, F | A, B, C, D, E | A, B, C, D, E | A, B |  |
| week 9 | inst. sw | A, B, C, D, E, F | A, B, C, D, E | A, B, C, D, E | A, B | A, B, C, D, E, F |
|  | scan meth | custom | custom | full scan | full sc. |  |
|  | found sw | A, B, C, D, E, F | A, B, C, D, E | A, B, C, D, E | A, B |  |

In table 1, agents are shown—agent 1, 2, 3, and 4—as examples which may run on dedicated computing system 1 to 4. During an initialization phase, the applied scan method may be a "full scan". This full scan may be performed during the first scan procedure on all computing systems of the relevant defined group. Here, the group may be defined as comprising computing systems to 4. For example, on computing system 1 the software components or programs A, B, C may be installed. The installed software programs on computing systems 2 to 4 may be as indicated in the table. As a result of this first full scan procedure, the base software installation catalogue may comprise entries for software programs A. B, C, D. This may also be indicated in the table by the column "found software" or "found sw".

During the following weeks—week 1 to week 9 are shown as examples—only on selected computing systems a full scan procedure may be performed, as indicated by table 1. On the remaining computing systems of the related group the second scan procedure using the base software installation catalogue may be performed. In table 1 this is denoted as "custom".

As an additional example, in week 8 a full scan procedure may be planned for two computing systems of the group, in particular computing system 1 and computing system 2. In week 9, the full scan procedure may be planned for the other two computing systems—3 and 4—running agent 3 and 4.

As can be seen from the table 1, installed software programs and discovered or found software programs match each other in a given week. From week to week, more or less software programs may be installed on a given computing system. The agent responsible for discovering the installed software program on that computing system may discover less, more, or identical software programs if compared to the week before. Consequently, the entries in the base software installation catalogue are changing over time. However, there may always be one entry in the base software installation catalogue for each software program or component found on one of the computing systems in the related group.

Other schedules for running a full scan procedure on any on the computing systems may be defined. The group may also be much larger than indicated in table 1.

The shown computing systems may also be implemented as virtual machines. It may also be a mixture of virtual and physical machines. On the other hand, the physical machines may be the same but may run a different operating system. Any combination may be possible.

Figure 4:
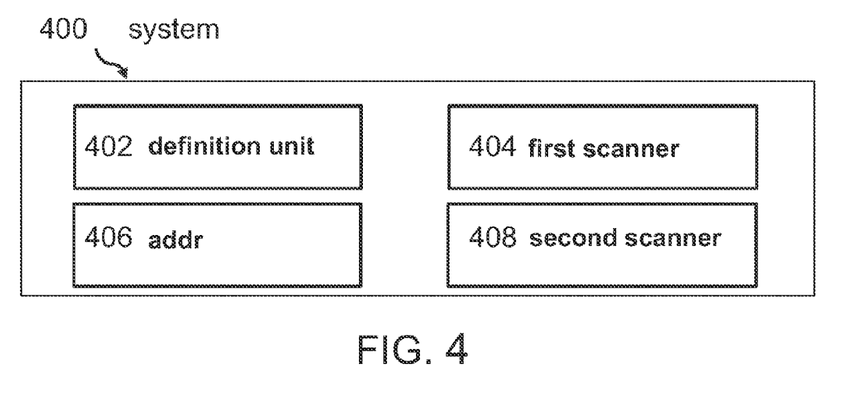
FIG. 4 shows an embodiment of a system for software discovery in an environment with heterogeneous machine groups.

FIG. 4 shows a block diagram of an embodiment of a software discovery system 400 for identifying installed computer programs. The system may comprise a definition unit 402 adapted for defining a group comprising computing systems that have similar software program installations, and a first scanner 404 adapted for performing a first scan procedure by scanning each computing system of the group using a first software signature catalogue to identify installed programs. Moreover, the system may comprise an adder 406 adapted for adding software signatures of identified installed programs to a base installation software catalogue, and a second scanner 408 adapted for performing a second scan procedure by scanning the group of computing systems using the base installation software catalogue to identify installed software programs, wherein the second scan procedure may be performed—in particular, at a later time than performing the first scan procedure.

The first scanner and the second scanner may be identical or the same and differentiate only in the used software catalogue, i.e., the first software catalogue, the base installation software catalogue.

Figure 5:
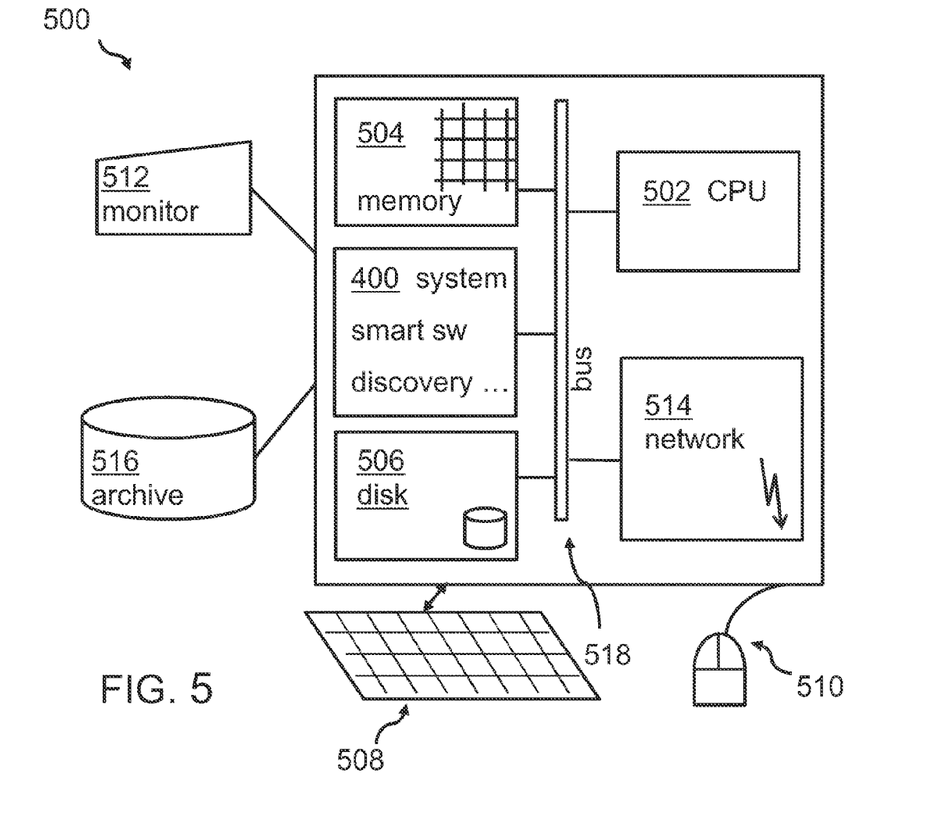
FIG. 5 shows an embodiment of a computing system comprising the system for software discovery in an environment with heterogeneous machine groups.

Embodiments of the invention may be implemented together with virtually any type of computer, regardless of the platform being suitable for storing and/or executing program code. For example, as shown in FIG. 5, a computing system 500 may include one or more processor(s) 502 with one or more cores per processor, associated memory elements 504, an internal storage device 506 (e.g., a hard disk, an optical drive, such as a compact disk drive or digital video disk (DVD) drive, a flash memory stick, a solid-state disk, etc.), and numerous other elements and functionalities, typical of today's computers (not shown). The memory elements 504 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 516 for an execution. Elements inside the computer 500 may be linked together by means of a bus system 518 with corresponding adapters. Additionally, the system 400 for software discovery in an environment with heterogeneous machines may be attached to the bus system 518.

The computing system 500 may also include input means such as a keyboard 508, a pointing device such as a mouse 510, or a microphone (not shown). Alternatively, the computing system may be equipped with a touch sensitive screen as main input device. Furthermore, the computer 500, may include output means such as a monitor or screen 512 [e.g., a liquid crystal display (LCD), a plasma display, a light emitting diode display (LED), or cathode ray tube (CRT) monitor]. The computer system 500 may be connected to a network [e.g., a local area network (LAN), a wide area network (WAN)], such as the Internet or any other similar type of network, including wireless networks via a network interface connection 514. This may allow a coupling to other computer systems, or a storage network, or a tape drive. Those, skilled in the art will appreciate that many different types of computer systems exist, and the aforementioned input and output means may take other forms. Generally speaking, the computer system 500 may include at least the minimal processing, input and/or output means, necessary to practice embodiments of the invention.

While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store, a program for use, by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions, which execute on the computer or other programmable apparatus, provide processes for implementing the functions/acts specified in the flowchart and/or block diagram, block, or blocks.

The block diagrams in the Figures illustrate the architecture, functionality, and operation of possible implementations of systems, methods and computer program products, according to various embodiments of the present disclosure. In this regard, each block in the block diagrams may represent a module, segment, or portion of code, which comprises one or more executable instructions for implementing the specified logical function(s). It should also be noted that, in some alternative implementations, the functions, discussed hereinabove, may occur out of the disclosed order. For example, two functions taught in succession may, in fact, be executed substantially concurrently, or the functions may sometimes be executed in the reverse order depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

The invention claimed is:

1. A method for identifying installed software programs, the method comprising:
   defining a group comprising computing systems that each have installed software program installations;
   performing a first scan procedure by scanning one selected computing system of the group of computing systems using a first software signature catalogue to identify installed software programs that are installed on the selected computing system and are identified in the first software signature catalogue;

adding software signatures of identified installed software programs identified during the first scan procedure using the first software signature catalogue to a base installation software catalogue, wherein the base installation software catalogue is of a smaller size than the first software signature catalogue; and for each and only remaining computing system in the group of computing systems, performing a second scan procedure by scanning the remaining computing system of the group of computing systems using the base installation software catalogue to identify software programs that are installed on the remaining computing system and are identified in the base installation software catalogue, to identify software programs installed on the remaining computing system and not identified in the base installation software catalogue, and to identify software programs not installed on the remaining computing system and are identified in the base installation software catalogue, thereby the second scan procedure runs faster and at a reduced workload, relative to the first scan procedure, due to the smaller size of the base installation software catalogue.

2. The method according to claim 1, further comprising: generating a list of computing systems forming a sub-group of the group of computing systems having similar installed software program installations, wherein those computing systems are put on the list of computing systems whose relative number of identical installed software programs is higher than a relative number of installed software programs of the group of computing systems.

3. The method according to claim 2, wherein the relative number of identical installed software programs within the sub-group is selected to be above a threshold.

4. The method according to claim 2, wherein the computing systems of the sub-group are selected based on a directive external to the group of computing systems.

5. The method according to claim 1, wherein a software signature is removed from the base installation software catalogue if a related installed software program is not discovered during the second scan procedure on any of the remaining computing system of the group of computing systems.

6. The method according to claim 1, wherein a software signature of a subsequently identified installed software program is added to the base installation software catalogue if the subsequently identified installed software program is discovered as an installed software program during the second scan procedure on any of the remaining computing system of the group of computing systems.

7. The method according to claim 1, wherein the selected computing system on which the first scan procedure is performed is defined by an external setting.

8. The method according to claim 1, wherein the selected computing system on which the first scan procedure is performed is selected based on a predefined schema.

9. The method according to claim 1, wherein the selected computing system on which the first scan procedure is performed is selected based on the workload of the computing systems of the group.

10. A software discovery system for identifying installed software programs, the system comprising:
a processor; and
a memory coupled to the processor, wherein the memory comprises instructions which, when executed by the processor, cause the processor to:

define a group comprising computing systems that each have installed software program installations;

perform a first scan procedure by scanning one selected computing system of the group of computing systems using a first software signature catalogue to identify installed software programs that are installed on the selected computing system and are identified in the first software signature catalogue;

add software signatures of identified installed software programs identified during the first scan procedure using the first software signature catalogue to a base installation software catalogue, wherein the base installation software catalogue is of a smaller size than the first software signature catalogue; and for each and only remaining computing system in the group of computing systems, perform a second scan procedure by scanning the remaining computing system of the group of computing systems using the base installation software catalogue to identify software programs that are installed on the remaining computing system and are identified in the base installation software catalogue, to identify software programs installed on the remaining computing system and not identified in the base installation software catalogue, and to identify software programs not installed on the remaining computing system and are identified in the base installation software catalogue, thereby the second scan procedure runs faster and at a reduced workload, relative to the first scan procedure, due to the smaller size of the base installation software catalogue.

11. A computer program product for identifying installed software programs, comprising a non-transitory computer readable storage medium having a computer readable program stored therein, wherein the computer readable program, when executed on a computing device, causes the computing device to:

define a group comprising computing systems that each have installed software program installations;

perform a first scan procedure by scanning one selected computing system of the group of computing systems using a first software signature catalogue to identify installed software programs that are installed on the selected computing system and are identified in the first software signature catalogue;

add software signatures of identified installed software programs identified during the first scan procedure using the first software signature catalogue to a base installation software catalogue, wherein the base installation software catalogue is of a smaller size than the first software signature catalogue; and for each and only remaining computing system in the group of computing systems, perform a second scan procedure by scanning the remaining computing system of the group of computing systems using the base installation software catalogue to identify software programs that are installed on the remaining computing system and are identified in the base installation software catalogue, to identify software programs installed on the remaining computing system and not identified in the base installation software catalogue, and to identify software programs not installed on the remaining computing system and are identified in the base installation software catalogue, thereby the second scan procedure runs faster and at a reduced workload, relative to the first scan procedure, due to the smaller size of the base installation software catalogue.

12. The computer program product according to claim 11, wherein the computer readable program further causes the computing device to:
    generate a list of computing systems forming a sub-group of the group of computing systems having similar installed software program installations, wherein those computing systems are put on the list of computing systems whose relative number of identical installed software programs is higher than a relative number of installed software programs of the group of computing systems.

13. The computer program product according to claim 11, wherein a software signature is removed from the base installation software catalogue if a related installed software program is not discovered during the second scan procedure on any of the remaining computing system of the group of computing systems.

14. The computer program product according to claim 11, wherein a software signature of a subsequently identified installed software program is added to the base installation software catalogue if the subsequently identified installed software program is discovered as an installed software program during the second scan procedure on any of the remaining computing system of the group of computing systems.

15. The software discovery system according to claim 10, wherein the instructions further cause the processor to:
    generate a list of computing systems forming a sub-group of the group of computing systems having similar installed software program installations, wherein those computing systems are put on the list of computing systems whose relative number of identical installed software programs is higher than a relative number of installed software programs of the group of computing systems.

16. The software discovery system according to claim 10, wherein a software signature is removed from the base installation software catalogue if a related installed software program is not discovered during the second scan procedure on any of the remaining computing system of the group of computing systems.

17. The software discovery system according to claim 10, wherein a software signature of a subsequently identified installed software program is added to the base installation software catalogue if the subsequently identified installed software program is discovered as an installed software program during the second scan procedure on any of the remaining computing system of the group of computing systems.

* * * * *